United States Patent
Norimatsu

(10) Patent No.: US 6,857,782 B2
(45) Date of Patent: *Feb. 22, 2005

(54) MAGNETIC ENCODER AND WHEEL BEARING ASSEMBLY USING THE SAME

(75) Inventor: Takayuki Norimatsu, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/244,472

(22) Filed: Sep. 17, 2002

(65) Prior Publication Data

US 2003/0053726 A1 Mar. 20, 2003

(30) Foreign Application Priority Data

Sep. 18, 2001 (JP) .................................... 2001-282628

(51) Int. Cl.⁷ .............................................. F16C 19/08
(52) U.S. Cl. ...................................................... 384/448
(58) Field of Search ................................ 384/448, 446, 384/544; 324/174

(56) References Cited

U.S. PATENT DOCUMENTS 6,559,633 B1 * 5/2003 Nachtigal et al. ........... 324/174
2002/0028032 A1 * 3/2002 Norimatsu ................... 384/448

* cited by examiner

Primary Examiner—Lenard A Footland

(57) ABSTRACT

To provide a magnetic encoder in which an air gap between it and a magnetic sensor can be increased and the magnetic force generated thereby can be easily quality-controlled, and a wheel bearing assembly having the magnetic encoder, the magnetic encoder 20 includes a core metal 11 and an elastic member 14 integrated with the core metal 11 in a ring-shaped configuration. The elastic member 14 is made from an elastic material mixed with a powder of magnetic material and has a plurality of different magnetic poles alternating in a direction circumferentially thereof. The elastic member 14 also has a Shore hardness of not lower than Hs 90. A wheel bearing assembly is also provided, which makes use of the magnetic encoder 20 as a component part of a sealing unit 5.

7 Claims, 3 Drawing Sheets

MAGNETIC ENCODER AND WHEEL BEARING ASSEMBLY USING THE SAME

BACKGROUND OF THE INVENTION

1. Field of the Invention

The present invention relates to a magnetic encoder forming a part of a rotation detecting device for detecting the rotational speed of a rotary element such as, for example a wheel, and a wheel bearing assembly utilizing such magnetic encoder.

2. Description of the Prior Art

A magnetic encoder utilizing a magnetic rubber has hitherto been largely employed in a wheel bearing assembly for supporting a vehicle wheel. This type of magnetic encoder is of a structure in which an elastic member mixed with a powder of magnetic material is integrated with a core metal in a ring-shaped configuration with different magnetic polarities formed alternately in a direction circumferential of the ring-shaped elastic member. This magnetic encoder is, when it is in use, positioned in front of a magnetic sensor with an air gap intervening therebetween, to thereby complete the rotation detecting device for detecting the rotational speed of, for example, a vehicle wheel.

In recent years, the need has arisen to increase the size of the air gap between the magnetic encoder and the magnetic sensor so that the manufacturing cost of the rotation detecting device for the wheel bearing assembly of the kind referred to above can be suppressed by mitigating the stringent design tolerance in dimensional variation that occurs during assemblage of component parts of the rotational detecting device. Since the magnetic encoder is, when it is an axial type, susceptible to deflection in an axial direction during rotation thereof, the air gap is required to be set to a large value to a certain extent so that change in spacing between the magnetic encoder and the magnetic sensor resulting from the deflection can be accommodated in the tolerance requirement for assemblage of the component parts of the rotation detecting device. While the air gap is generally designed to be of a size within the range of 0.5 to 2.0 mm, requirement to suppress the manufacturing cost necessitates the air gap to be further increased to a value higher than 0.5 to 2.0 mm.

In order to increase the size of the air gap, it is necessary to increase a magnetic force produced by the magnetic encoder. In the conventional quality control, the magnetic force developed by the magnetic encoder has been controlled by measuring the magnetic flux density with the magnetic sensor brought close to the magnetic encoder. However, measurement with the use of the magnetic sensor involves some problems in that it takes a relatively long time to complete the measurement and in that measurements tend to vary depending on the site of measurement (measuring environment). To suppress the manufacturing cost, the need has arisen to ease the quality control as well.

SUMMARY OF THE INVENTION

In view of the foregoing, an object of the present invention is to provide a magnetic encoder capable of working with an increased air gap between the magnetic encoder and a magnetic sensor and also, capable of exerting the magnetic force of a quality that is easy to control.

Another object of the present invention is to provide a wheel bearing assembly capable of effectively utilizing characteristics of the magnetic encoder of the type referred to above, and also capable of contributing to reduction of the manufacturing cost by mitigating the tolerance requirement for installation of the magnetic encoder to the wheel bearing assembly.

The magnetic encoder according to the present invention is of a type in which an elastic member mixed with a powder of magnetic material is integrated with a core metal in a ring-shaped configuration with different magnetic polarities formed alternately in a direction circumferential of the ring-shaped elastic member, and has a feature in that the elastic material employed has a Shore hardness of a value equal to or higher than Hs 90. This magnetic encoder may be either an axial type or a radial type.

In another aspect of the present invention, the wheel bearing assembly of the present invention makes use of the magnetic encoder of the structure discussed above.

Thus, according to the present invention, selection of the Shore hardness of the elastic member not lower than Hs 90 is effective not only to increase the size of the air gap between the magnetic encoder and the magnetic sensor, but also to ease the quality control of the magnetic force generated by the magnetic encoder, as discussed in detail hereinafter. In the magnetic encoder in which the elastic member is employed in the form of a magnetic rubber mixed with the powdery magnetic material, the greater the amount of the powdery magnetic material in the magnetic rubber, the higher the magnetic force developed thereby, and consequently, the air gap between the magnetic encoder and the magnetic sensor can be increased in size. On the other hand, the greater the amount of the powdery magnetic material in the magnetic rubber, the harder the magnetic rubber (i.e., the higher the hardness of the magnetic rubber). In other words, the magnetic rubber having a high Shore hardness is an outcome of a relatively great amount of the powdery magnetic material mixed therein and, hence, the air gap between the magnetic encoder and the magnetic sensor can be increased because of the increased magnetic force.

In view of the foregoing, the inventor of the present invention has conducted a series of studies to determine a correlation between the capability of the air gap being increased and the Shore hardness of the magnetic rubber and has found that while the conventional magnetic encoder makes use of the magnetic rubber of a Shore hardness of about Hs 80, selection of the Shore hardness not lower than Hs 90 could result in provision of the magnetic encoder capable of working satisfactorily with the increased air gap.

When based on this finding the magnetic encoder employing the magnetic rubber of a Shore hardness of Hs 90 was mounted on a wheel bearing assembly, the air gap between the magnetic encoder and the magnetic sensor could be increased to 2 mm or greater, which value has hitherto been unattained. As discussed hereinabove, it is a recent need to increase the air gap so that the manufacturing cost can be suppressed by mitigating the tolerance requirement during assemblage of component parts to complete the magnetic encoder and, accordingly, with the magnetic encoder according to the present invention, the air gap can be increased and, therefore, the need hitherto encountered with can be fulfilled satisfactorily.

Also, according to the state of art, since the magnetic force, which is one of important items of the magnetic encoder that is quality-controlled, has been controlled by measuring the magnetic flux density with the magnetic sensor brought close to the magnetic encoder, not only does it take a relatively long time to complete the measurement, but also measurements tend to vary depending on the measuring environment as hereinbefore discussed. However, with the magnetic encoder according to the present invention, since the magnetic force can be controlled or adjusted by carefully selecting the Shore hardness of the magnetic rubber and, hence, that of the elastic member, the precise quality control of the magnetic encoder can be done by the measurement of the Shore hardness of the elastic member more easily than by the measurement with the magnetic sensor.

Thus, the present invention is effective to provide the magnetic encoder in which the air gap can be increased and the quality control thereof can be easily attained.

In the practice of the present invention, the upper limit, that is, the maximum permissible value, of the Shore hardness of the elastic member is preferably Hs 98 with Hs 90 taken as a lower limit, that is, the minimum permissible Shore hardness. Selection of the maximum permissible Shore hardness of Hs 98 for the elastic member in the magnetic encoder of the present invention is effective to avoid the possibility that the use of too much powdery magnetic material in the elastic member may result in an insufficient amount of an elastic material used as a binder to such an extent as to render the resultant elastic member to be fragile, allowing the elastic member to have a required hardness.

In a preferred embodiment of the present invention, the elastic material for the elastic member is selected from the group consisting of a heat resistant nitrile rubber, hydrogenated nitrile rubber and acrylic rubber.

In another aspect of the present invention, there is also provided a bearing assembly utilizing the magnetic encoder of the structure discussed above. In such case, the magnetic encoder is mounted on a rotatable member of the bearing assembly that is adapted to be rotated. Since in this bearing assembly the magnetic encoder of the present invention can be used in combination with the magnetic sensor with the air gap of an increased size intervening therebetween, the bearing assembly according to the present invention can be assembled with the stringent design tolerance in dimensional variation during the assemblage of the component parts having been mitigated and, hence, the manufacturing cost of the bearing assembly can advantageously be suppressed.

According to a further aspect of the present invention, there is also provided a wheel bearing assembly for rotatably supporting a wheel relative to a vehicle body structure, which includes an outer member having an inner peripheral surface formed with a plurality of rows of outer raceways; an inner member having an outer peripheral surface formed with corresponding rows of inner raceways aligned with the respective rows of the outer raceways; a plurality of rows of rolling elements interposed between the outer and inner members and accommodated in part within the respective outer raceway and in part within the respective inner raceway to thereby allow the inner and outer members to be rotatable relative to each other; a wheel mounting flange formed in one of the outer and inner members that serves as a rotatable member; a magnetic encoder including a core metal; and at least one sealing unit for sealing an annular open end of a cylindrical space between the inner and outer members and carrying the magnetic encoder.

The sealing unit referred to above includes a generally L-sectioned first sealing plate mounted on the rotatable member and having an inner cylindrical wall and a radially outwardly extending upright wall that lies generally perpendicular to the inner cylindrical wall; and a generally L-sectioned second sealing plate mounted on one of the outer and inner members that serves as a stationary member, and positioned so as to confront the first sealing plate and having an outer cylindrical wall and a radially inwardly extending upright wall that lies generally perpendicular to the outer cylindrical wall. The second sealing plate has, secured thereto, a side sealing lip slidingly engaging the radially outwardly extending upright wall of the first sealing plate, and at least one radial sealing lip slidingly engaging the cylindrical wall of the first sealing plate. The magnetic encoder is specifically formed on the radially outwardly extending upright wall of the first sealing plate with the core metal defined by said first sealing plate.

With the wheel bearing assembly so constructed as hereinabove described, since the magnetic encoder can be incorporated as a part of the sealing unit for the bearing assembly, the magnetic encoder can be installed compactly with good assemblability. Since in this sealing unit the first and second sealing plates confront with each other and the side sealing lip and the radial sealing lip slidingly engage, a high sealability can be achieved. Where the magnetic encoder is provided as a part of the sealing unit in the manner described above, in order to obtain an effect of effectively enhanced assemblability, it is desirable that the air gap between the magnetic encoder and the magnetic sensor can be increased in size. With the magnetic encoder according to the present invention, the need to secure the increased air gap can be fulfilled and, accordingly, when this is applied to the wheel bearing assembly of the structure described above, effects of good assemblability and efficient compactization can be obtained effectively.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
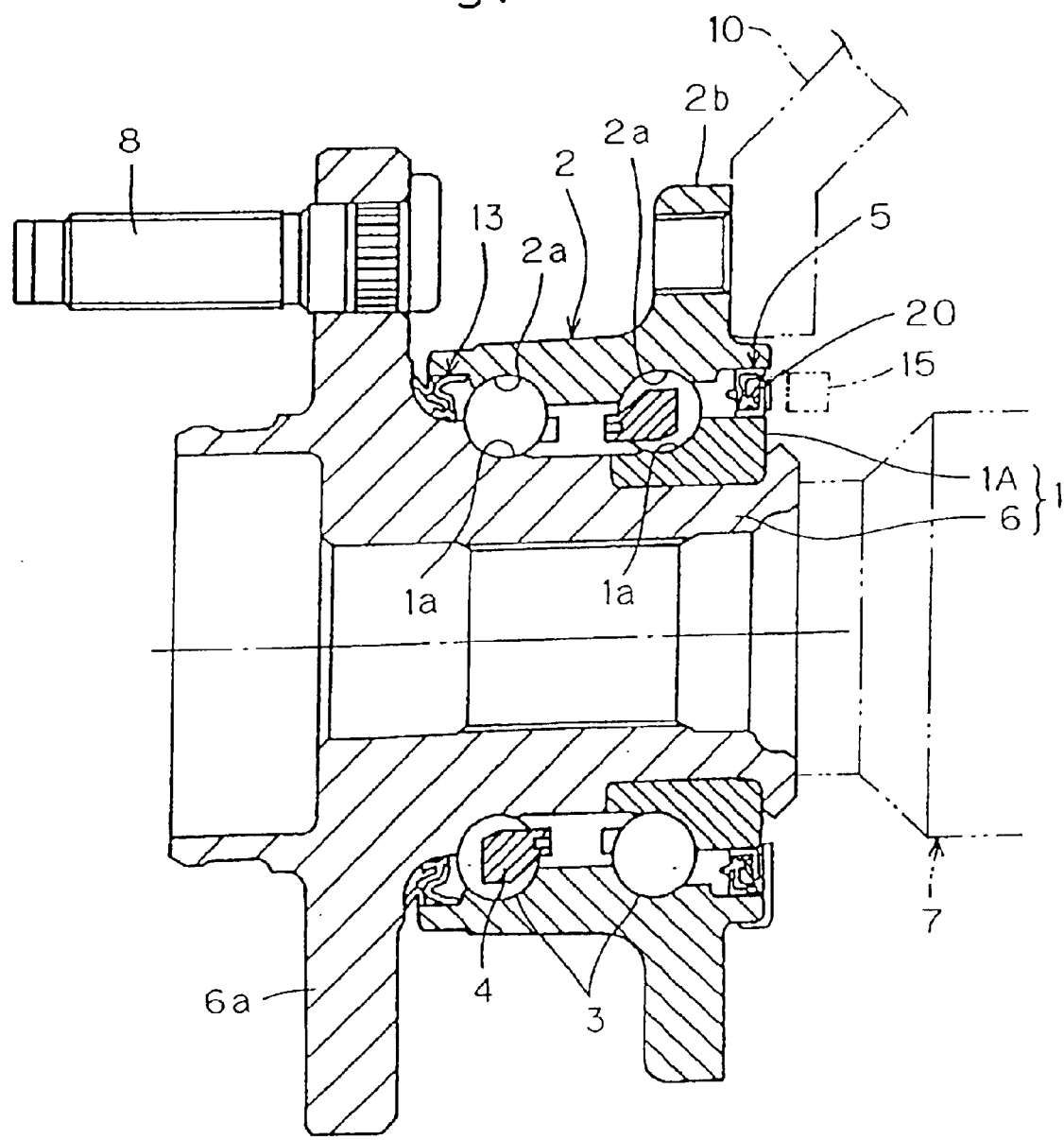
FIG. 1 is a longitudinal sectional view of a wheel bearing assembly equipped with a magnetic encoder of an axial type in accordance with a first preferred embodiment of the present invention.
Figure 2:
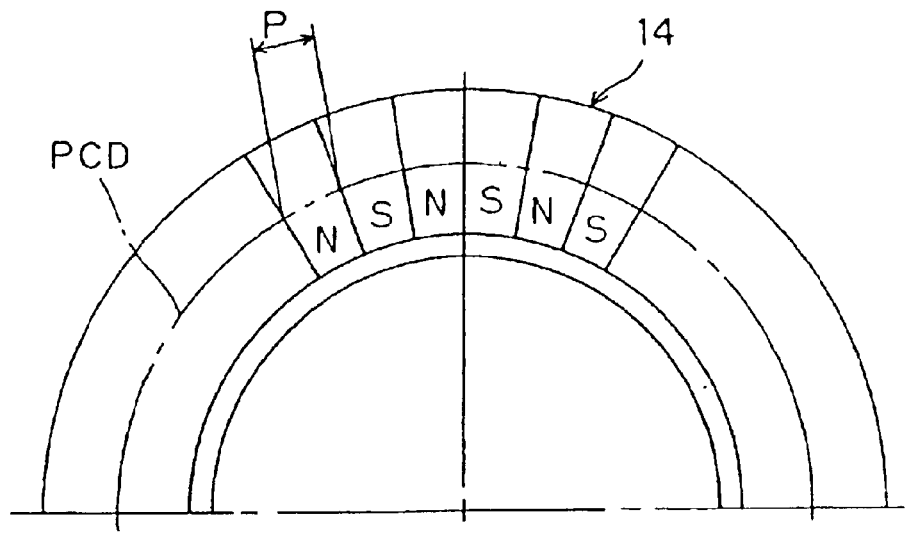
FIG. 2 is a fragmentary front elevational view, on an enlarged scale, of an elastic member forming a part of the magnetic encoder shown in FIG. 1.
Figure 3:
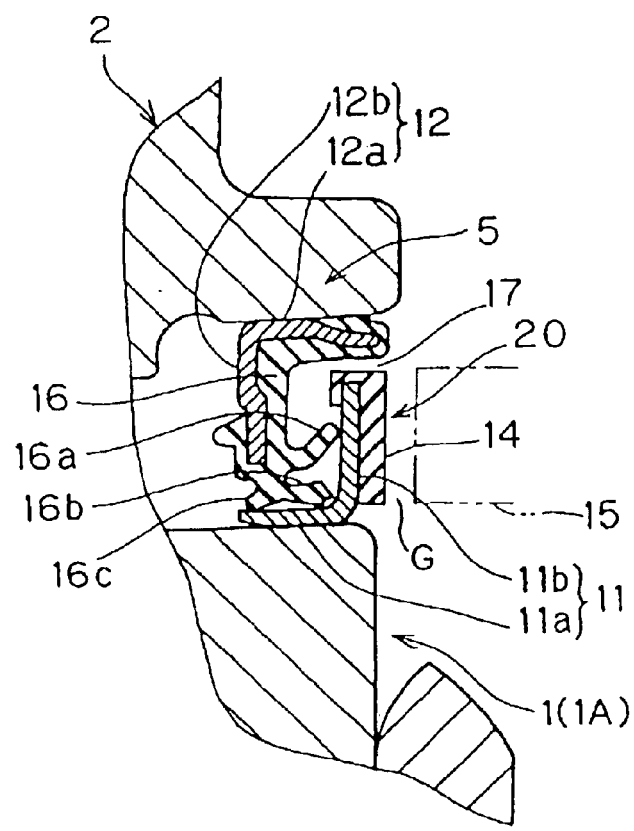
FIG. 3 is a fragmentary sectional view of the wheel bearing assembly shown in FIG. 1.

Referring first to FIGS. 1 to 3 pertaining to a first preferred embodiment of the present invention, there is shown, in a longitudinal sectional representation, a wheel bearing assembly equipped with a magnetic encoder. The wheel bearing assembly shown therein includes an inner member 1, an outer member 2 substantially enclosing the inner member 1 to define a generally cylindrical space therebetween, a plurality of rows of rolling elements 3 rollingly movably interposed between the inner and outer members 1 and 2, and axially spaced sealing units 5 and 13 for sealing opposite annular ends of the cylindrical space that is delimited between the inner and outer members 1 and 2. One of the sealing units, that is, the right sealing unit 5 as viewed in FIG. 1 is provided with a magnetic encoder 20 of an axial type as will be detailed hereinafter.

The inner member 1 has an outer peripheral surface formed with axially spaced inner raceways 1a in the form of a radially inwardly recessed groove whereas the outer member 2 has an inner peripheral surface formed with similarly axially spaced outer raceways 2a in the form of a radially outwardly recessed groove, which raceways 2a are aligned with the inner raceways 1a in the inner member 1. The rows of the rolling elements 3 are accommodated in part within the inner raceways 1a and in part within the outer raceways 2a so that the inner and outer members 1 and 2 can rotate relative to each other. In practice, the inner and outer members 1 and 2 may be an bearing inner race and a bearing outer race, respectively. In addition, the inner member 1 may be an axle or shaft. The rolling elements 3 may be either balls or rollers, although balls are employed for the rolling elements 3 in the illustrated embodiment.

The wheel bearing assembly of the structure discussed above may be a double row rolling bearing, particularly a double row angular contact ball bearing and the bearing inner race of such bearing assembly is comprised of a hub wheel 6 and a separate inner race segment 1A fixedly mounted externally on a right end portion of the hub wheel 6. Hence, one of the inner raceways, that is, the right inner raceway 1a as viewed in FIG. 1 is defined in an outer peripheral surface of the separate inner race segment 1A while the left inner raceway 1a is defined in the outer peripheral surface of the hub wheel 6 as clearly shown in FIG. 1.

The hub wheel 6 is coupled at a right end thereof with one end (for example, an outer race) of a constant velocity universal joint 7 while a wheel (not shown) is drivingly coupled with a radially outwardly extending flange 6a of the hub wheel 6 by means of a plurality of bolts 8. The other end (for example, an inner race) of the constant velocity universal joint 7 is coupled with a drive shaft (not shown). The outer member 2 is comprised of a bearing outer race having a radially outwardly extending flange 2b that is secured to a housing 10 including, for example, a knuckle. The outer member 2 has its inner peripheral surface formed with the raceways 2a and 2a for the rows of the rolling elements 3. As a matter of design, the rolling elements 3 of each row are orderly retained by a retainer 4. The cylindrical space delimited between the inner and outer members 1 and 2 has a right annular end sealed by the respective sealing units 5 and a left annular end adjacent the radial flange 6a sealed by the sealing unit 13.

The details of the sealing unit 5 are fragmentarily shown in FIG. 3 on an enlarged scale. As shown therein, the sealing unit 5 includes first and second annular sealing plates 11 and 12 secured to the inner and outer members 1 and 2, respectively. These first and second sealing plates 11 and 12 are made of steel and secured to the inner and outer members 1 and 2, respectively, under interference fit. The first sealing plate 11 is of a generally L-sectioned configuration including a cylindrical wall 11a, press fitted onto the outer peripheral surface of the inner member 1, and an upright wall 11b extending radially outwardly from one end of the cylindrical wall 11a towards the outer member 2, whereas the second sealing plate 12 is of a generally L-sectioned configuration including a cylindrical wall 12a, press fitted onto the inner peripheral surface of the outer member 2, and an upright wall 12b extending radially inwardly from one end of the cylindrical wall 12a towards the inner member 1.

The first sealing plate 11 is mounted on one of the inner and outer members 1 and 2 that is rotatable relative to the other, that is, the inner member 1 and serves as a slinger. This first sealing plate 11 is a magnetic body. The radially outwardly extending upright wall 11b the first sealing plate 11 is positioned adjacent the annular opening of the right annular end of the cylindrical space between the inner and outer members 1 and 2 and has an axially outer annular surface to which an annular elastic member 14 made from an elastic material mixed with a powdery magnetic material is firmly secured.

The annular elastic member 14 referred to above forms a part of the axial type magnetic encoder 20 with the first sealing plate 11 used as a core metal and is in the form of a magnetic rubber having a plurality of alternating N and S magnetic poles defined therein in a circumferential direction as shown in FIG. 2. The N and S magnetic poles in the annular elastic member 14 are alternately arranged at intervals of a predetermined pitch p as measured along the pitch circle diameter (PCD) as shown in FIG. 2.

Cooperable with this annular elastic member 14 of the magnetic encoder 20 is a magnetic sensor 15 positioned so as to axially confront the annular elastic member 14 with an air gap G of a predetermined size intervening therebetween. The annular elastic member 14 and the magnetic sensor 15 cooperate with each other to define a rotation detecting device for detecting the rotational speed of the wheel. As a matter of course, the magnetic sensor 15 is fixed to a vehicle body structure and provides an output signal that may be utilized to control, for example, a vehicle anti-skid brake system.

The second sealing plate 12 is integrated with a side sealing lip 16a, adapted to slidingly engage the radially outwardly extending upright wall 11b of the first sealing plate 11, and first and second radial sealing lips 16b and 16c adapted to slidingly engage the cylindrical wall 11a of the first sealing plate 11. These sealing lips 16a to 16c are respective parts of an elastic element 16 that is bonded by vulcanization to the second sealing plate 12. The second sealing plate 12 firmly clamps a portion of the elastic element 16 at a region where the second sealing plate 12 is interconnected with the outer member 2 that is a stationary member. The cylindrical wall 12a of the second sealing plate 12 is spaced a slight distance radially from a free edge of the radially outwardly extending upright wall 11b of the first sealing plate 11 so as to define a labyrinth seal 17 therebetween.

The annular elastic member 14 of the magnetic encoder 20 has a Shore hardness not lower than Hs 90. This Shore hardness is represented by the hardness of an annular surface of the elastic member 14. Preferably, the upper limit of the Shore hardness of the elastic member 14 is Hs 98. This annular elastic member 14 is made of an elastic material mixed with the powdery magnetic material. The elastic material for the annular elastic member 14 is preferably a rubber material or the like, which may be selected from the group consisting of, for example, a heat resistant nitrile rubber, hydrogenated nitrile rubber, acrylic rubber and others. The powdery magnetic material may be made of, for example, ferrite and has an average particle diameter in the range of 10 to 200 μm.

Thus, according to the present invention, since the magnetic encoder 20 makes use of the elastic member 14 of a Shore hardness not lower than Hs 90, the air gap G between the magnetic encoder 20 and the magnetic sensor 15 can have an increased size that has hitherto been unattained, as will now be discussed.

Specifically, in the magnetic encoder 20 in which the magnetic rubber is employed for the elastic member 14, the greater the amount of the powdery magnetic material in the magnetic rubber, the higher the magnetic force developed thereby, and consequently, the air gap G between the magnetic encoder 20 and the magnetic sensor 15 can be increased in size. On the other hand, since the Shore hardness of the magnetic rubber increases as the amount of the powdery magnetic material mixed therein is increased, it appears that the increased Shore hardness of the magnetic rubber means the powdery magnetic material having been employed in a relatively greater amount.

In view of the foregoing, the inventor of the present invention has conducted a series of studies to determine a correlation between the capability of the air gap being increased and the Shore hardness of the magnetic rubber. As a result thereof, it has been found that when the Shore hardness of the magnetic rubber employed in the practice of the present invention was chosen to be of a value not lower than Hs 90 while the conventional magnetic encoder makes use of the magnetic rubber of a Shore hardness of about Hs 80, a predetermined magnetic flux density (±3 mT or higher) could be detected when the air gap G is 2.0 mm. If the Shore hardness is chosen to be Hs 80, the predetermined magnetic flux density discussed above could be attained only when the air gap G was of a size not greater than 1.9 mm, but was undetectable when the air gap G was 2.0 mm in size. In contrast thereto, if the Shore hardness is chosen to be Hs 90, the predetermined magnetic flux density discussed above could be detected even when the air gap G was 2.0 mm in size. With the Shore hardness of the magnetic rubber at Hs 90, the precision could be detected in which the size variation per pitch was ±2% (not higher than 4% in range).

The predetermined magnetic flux density discussed above (±3 mT or higher) represents a value required for the magnetic sensor 15 to detect the polarity of the magnetic encoder 20 stably. ±2% of the size variation per pitch referred to above is a pitch precision required for detection of the rotational speed of vehicle wheels. This size variation per pitch represents a maximum value of variation from an ideal pitch obtained by measuring the pitch of an output waveform representative of one complete rotation that is outputted from the magnetic sensor when the magnetic encoder 20 undergoes one complete rotation.

As discussed above, since the magnetic encoder 20 can have the air gap G of 2.0 mm or greater in relation to the magnetic sensor 15, when the magnetic encoder 20 is applied to the wheel bearing assembly such as in the illustrated embodiment, the design tolerance in dimensional variation that occurs during assemblage of component parts can be mitigated to allow assemblage of the wheel bearing assembly to be simplified along with suppression of the manufacturing cost. Also, control of the magnetic force developed by the magnetic encoder 20 can be made by choosing the Shore hardness of the elastic member 14 to a value not lower than Hs 90, in place of the conventional control relying on the measurement of the magnetic flux density with the magnetic sensor and, accordingly, a more precise than that achieved by the conventional control relying on the measurement with the magnetic sensor can advantageously be achieved easily.

Selection of the maximum permissible Shore hardness of Hs 98 of the elastic member 14 in the magnetic encoder 20 is effective to avoid the possibility that the use of too much powdery magnetic material in the elastic member may result in an insufficient amount of an elastic material used as a binder to such an extent as to render the resultant elastic member 14 to be fragile. Accordingly, the elastic member 14 employed in the present invention can have a required hardness. It is, however, to be noted that the Shore hardness of the elastic member 14 may be determined with no upper limit thereof being specifically fixed.

Also, in the wheel bearing assembly so far described and shown in connection with the first preferred embodiment of the present invention, since the magnetic encoder 20 is incorporated as a part of the sealing unit 5 at that annular open end of the space delimited between the inner and outer members 1 and 2, the magnetic encoder 20 can be installed compactly. In addition, since the sealing unit 5 is of the design in which the first and second sealing plates 11 and 12 confront with each other with the side lip 16a and the radial lip 16b held in siding contact with the first sealing plate 11, the sealing unit 5 can exhibit an excellent sealability.

Figure 4:
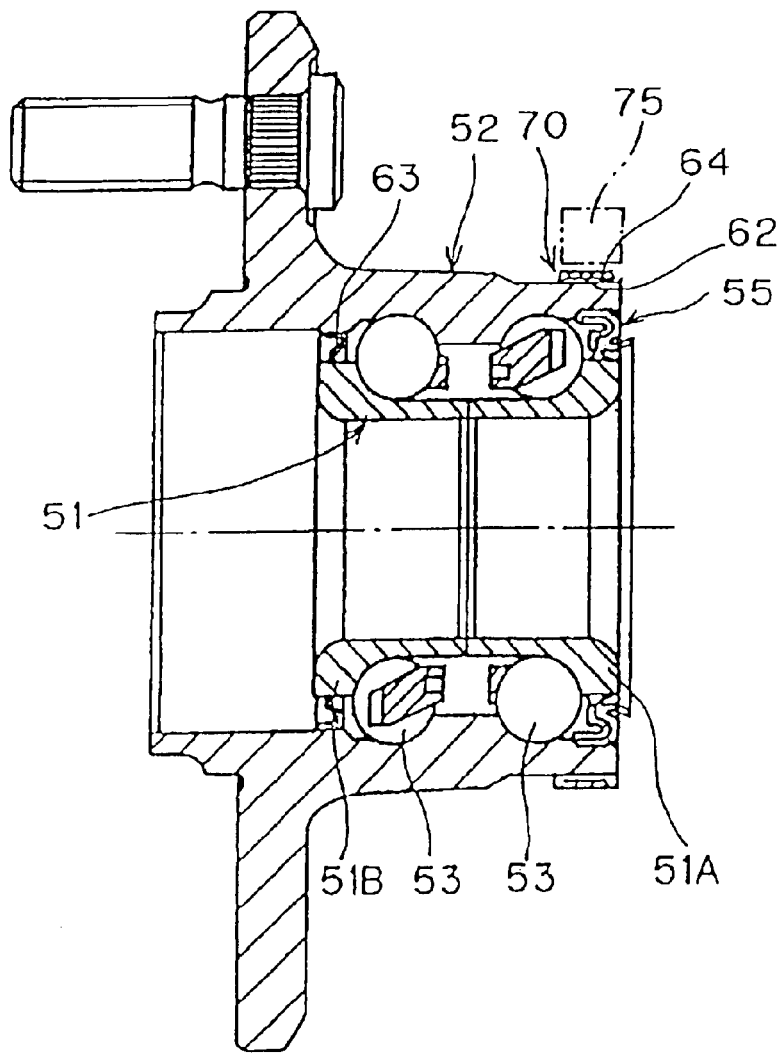
FIG. 4 is a longitudinal sectional view of a wheel bearing assembly equipped with a magnetic encoder of a radial type in accordance with a second preferred embodiment of the present invention.

FIG. 4 illustrates, in a longitudinal sectional representation, the wheel bearing assembly equipped with a magnetic encoder 70 of a radial type in accordance with a second preferred embodiment of the present invention. The wheel bearing assembly shown therein includes an inner member 51, an outer member 52 substantially enclosing the inner member 51 to define a generally cylindrical space therebetween, a plurality of, for example, two, rows of rolling elements 53 rollingly movably interposed between the inner and outer members 51 and 52, and axially spaced sealing units 55 and 63 for sealing opposite annular ends of the cylindrical space that is delimited between the inner and outer members 51 and 52. A magnetic encoder 70 of a radial type is fixedly mounted on a right end of the outer member 52 and is hence separate from the right sealing unit 55 as viewed in FIG. 4. As is the case with those in the foregoing embodiment, the inner member 51 has an outer peripheral surface formed with axially spaced inner raceways in the form of a radially inwardly recessed groove whereas the outer member 52 has an inner peripheral surface formed with similarly axially spaced outer raceways in the form of a radially outwardly recessed groove. The rows of the rolling elements 53 are accommodated in part within the inner raceways in the inner member 51 and in part within the outer raceways in the outer member 52 so that the inner and outer members 51 and 52 can rotate relative to each other.

The inner member 51 is made up of a pair of split inner race segments 51A and 51B and a fixed axle (not shown) engaged in part within the right inner race segment 51A and in part within the left inner race segment 51B. On the other hand, the outer member 52 is utilized as a rotary member rotatable relative to the inner member 51 and is in the form of a bearing outer race that concurrently serves as a hub wheel.

Figure 5:
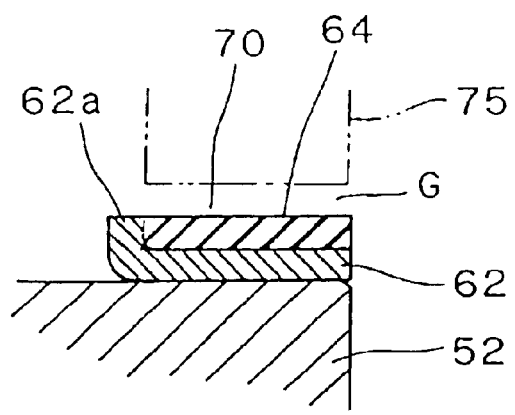
FIG. 5 is a fragmentary sectional view, on an enlarged scale, of an important portion of the magnetic encoder shown in FIG. 4.

The magnetic encoder 70 is mounted externally on the right end of the outer member 52 as described above. This magnetic encoder 70 includes, as shown in FIG. 5 on an enlarged scale, a generally cylindrical core metal 62 made of steel and fixedly mounted on an outer peripheral surface of the outer member 52, and a generally cylindrical elastic member 64 mounted on an outer peripheral surface of the core metal 62. The core metal 62 has a left end portion bent to define a radially outwardly extending flange 62a to thereby increase the rigidity of the core metal 62. The generally cylindrical elastic member 64 has a thickness as measured in a direction radially thereof, which is smaller than the width thereof as measured in a direction axially thereof.

As is the case with the elastic member 14 in the previously described embodiment, the elastic member 64 is a rubber magnetic, which is made from an elastic material mixed with a powdery magnetic material and has a plurality of alternating N and S magnetic poles defined therein in a circumferential direction. However, unlike the N and S magnetic poles in the annular elastic member 14, the N and S magnetic poles in the cylindrical elastic member 64 emanate magnetic forces in a direction radially of the elastic member 64. The material for the cylindrical elastic member 64 may be the same as that for the annular elastic member 14 employed in the previously described embodiment. Also, as is the case with the annular elastic member 14, this cylindrical elastic member 64 has a Shore hardness of not lower than Hs 90, with the upper limit thereof set to Hs 98. Reference numeral 75 represents a magnetic sensor carried by a fixed member and positioned so as to radially confront the cylindrical elastic member 64 with an air gap G of a predetermined size intervening therebetween.

Even though the magnetic encoder 70 is designed of the radial type, selection of the Shore hardness of not lower than Hs 90 for the cylindrical elastic member 64 makes it possible to increase the size of the air gap G to a value equal to or greater than 2 mm, and accordingly, quality control of the magnetic force generated thereby can be easily achieved by controlling the hardness of the cylindrical elastic member 64. Since even in this embodiment the air gap G of an increased size can be secured, the precision requirement concerning the position at which the magnetic sensor 75 is fitted relative to the wheel bearing assembly can be mitigated, allowing the assemblability to be increased and the manufacturing cost to be reduced.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel bearing assembly rotatably supporting a wheel relative to a vehicle body structure, said wheel bearing assembly comprising:
an outer member having an inner peripheral surface, said inner peripheral surface being formed with a plurality of rows of outer raceways;
an inner member having an outer peripheral surface, said outer peripheral surface being formed with a corresponding rows of inner raceways aligned with the respective rows of the outer raceways;
a plurality of rolling elements interposed between the outer and inner members and accommodated in part within the respective outer raceway and in part within the respective inner raceway to thereby allow the inner and outer members to be rotatable relative to each other;
a wheel mounting flange formed in one of the outer and inner members that serves as a rotatable member;
a magnetic encoder including a core metal; and
at least one sealing unit sealing an annular open end of a cylindrical space delimited between the inner and outer members, said sealing unit including:
a generally L-sectioned first sealing plate mounted on the rotatable member and having an inner cylindrical wall and a radially outwardly extending upright wall that lies generally perpendicular to the inner cylindrical wall;
a generally L-sectioned second sealing plate mounted on the other of the outer and inner members that serves as a stationary member, said second sealing plate being positioned so as to confront the first sealing plate and having an outer cylindrical wall and a radially inwardly extending upright wall that lies generally perpendicular to the outer cylindrical wall; and
said second sealing plate having secured thereto, a side sealing lip slidingly engaging the radially outwardly extending upright wall of the first sealing plate, and at least one radial sealing lip slidingly engaging the cylindrical wall of the first sealing plate;
said magnetic encoder
being formed on the radially outwardly extending upright wall of the first sealing plate with the core metal defined by said first sealing plate, and
further including an elastic member integrated with the core metal in a ring-shaped configuration, said elastic member
being made from an elastic material mixed with a powder of magnetic material, and
having a plurality of different magnetic poles alternating in a direction circumferentially thereof, and
having a Shore hardness not lower than Hs 90.

2. A wheel bearing assembly, comprising:
a magnetic encoder disposed on a rotatable member of the wheel bearing assembly, comprising
a core metal, and
an elastic member integrated with the core metal in a ring-shaped configuration; and
a magnetic sensor to sense the magnetic encoder, separated from the magnetic encoder by an air gap of at least 2 mm,
wherein the elastic member
is made from an elastic material mixed with a powder of magnetic material,
has a plurality of different magnetic poles alternating in a direction circumferentially thereof, and
has a Shore hardness not lower than Hs 90.

3. The wheel bearing assembly according to claim 2, wherein the magnetic encoder is an axial type.

4. The wheel bearing assembly according to claim 2, wherein the magnetic encoder is a radial type.

5. The wheel bearing assembly according to claim 2, wherein the Shore hardness of the elastic member is not higher than Hs 98.

6. The wheel bearing assembly according to claim 2, wherein the elastic material is one of heat resistant nitrile rubber, hydrogenated nitrile rubber, and acrylic rubber.

7. A wheel bearing assembly, comprising:
inner and outer members, one of which is a rotatable member;
at least one sealing unit to seal an annular open end of a cylindrical space defined between the inner and outer members;
a magnetic encoder disposed on the rotatable member of the wheel bearing assembly; and
a magnetic sensor to sense the magnetic encoder, separated from the magnetic encoder by an air gap of at least 2 mm,
wherein the air gap may be increased without breaking the seal of the cylindrical space,
and the magnetic encoder includes an elastic member integrated with a core metal in a ring-shaped configuration, the elastic member
being made from an elastic material mixed with a powder of magnetic material,
having a plurality of different magnetic poles alternating in a direction circumferentially thereof, and
having a Shore hardness not lower than Ha 90.

* * * * *

UNITED STATES PATENT AND TRADEMARK OFFICE
CERTIFICATE OF CORRECTION

PATENT NO. : 6,857,782 B2
DATED : February 22, 2005
INVENTOR(S) : Takayuki Norimatsu It is certified that error appears in the above-identified patent and that said Letters Patent is hereby corrected as shown below:

Column 10,
Line 65, change "Ha" to -- Hs --.

Signed and Sealed this

Ninth Day of August, 2005

JON W. DUDAS
*Director of the United States Patent and Trademark Office*